United States Patent Office 2,905,715
Patented Sept. 22, 1959

2,905,715
PROCESS FOR MAKING HYDROCARBONYL-MERCAPTOPHENONES

Andrew J. Dietzler and Edgar C. Britton, Midland, Mich., assignors to The Dow Chemical Company, Midland, Mich., a corporation of Delaware No Drawing. Application August 5, 1957
Serial No. 676,433

6 Claims. (Cl. 260—591)

This invention concerns an improved process for making ar-(hydrocarbonylmercapto) phenones having the general formula:

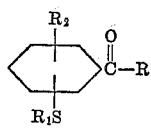

whrein R and $R_1$ are independently selected from the group consisting of the phenyl and alkyl radicals containing from 1 to 8 carbon atoms, and $R_2$ represents a member of the group consisting of hydrogen and the methyl radical, and in which phenones the $R_1S$ group is directly attached to one of the nuclear carbon atoms ortho and para to the nuclear carbon to which the carbonyl group of the phenone is linked.

Cutler et al., J. Am. Chem. Soc. vol. 74, pages 5475–5481, 1952, describe the preparation of a number of para-(hydrocarbonylmercapto) phenones. More specifically, a para-(alkylmercapto) phenone is prepared by procedure wherein an alkyl phenyl sulfidie, e.g. thioanisole, is added dropwise to a cold mixture of approximately equimolecular proportions of acetyl chloride and anhydrous aluminum chloride in dry chloroform as a reaction medium. Burton and Hu, J. Chem. Soc. (London) page 603, 1948, add acetic anhydride to a mixture of thio-anisole and aluminum chloride in carbon bisulfide as a reaction medium to obtain para-(methylmercapto) acetophenone.

The methods heretofore proposed for making ar-(hydrocarbonylmercapto) phenones have the disadvantage that the reaction is carried out in the presence of an organic liquid as reaction medium which adds to the cost of manufacture and increases the operations of recovering the product.

It has now been found that a mercaptide such as the sodium or potassium derivative of methyl-, ethyl-, propyl-, butyl-, octyl-, or phenyl-mercaptan can readily be reacted with a nuclear halogenated phenone, such as para-chloroacetophenone, para-chlorobenzophenone, para-chloropropiophenone, para-bromacetophenone, or ortho- chloroacetophenone, in a liquid aqueous medium at elevated temperatures to form the corresponding ar-(hydrocarbonylmercapto) phenone in good yield.

As the nuclear halogenated-phenone starting material for use in the process there may be employed one or more aromatic ketones having the general formula:

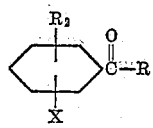

wherein R represent a member of the group consisting of the phenyl and alkyl radicals containing from 1 to 8 carbon atoms and $R_2$ is a member of the group consisting of hydrogen and the methyl radical, and X is a halogen atom such as chlorine or bromine directly attached to one of the nuclear carbons ortho and para to the carbonyl group. Examples of suitable ar-haloaromatic ketones are ortho- and para-chloro-acetophenone, ortho- and para-bromoacetophenone, ortho- and para-chlorobenzophenone, and ortho- and para-chloro-propiophenone, ortho- and para-chlorophenyl amyl ketone, ortho- and para-chlorophenyl octyl ketone, ortho- and para-bromphenyl ethyl ketone, 4-chloro-3-methylacetophenone, 4-chloro-3-methylbenzophenone, or ortho- and para-chlorophenyl ketone.

The mercaptide starting material can be an alkali metal mercaptide such as the sodium or potassium derivative of an alkyl-, or aryl-mercaptan having the general formula:

$$R_1S—M$$

wherein $R_1$ represents a hydrocarbon radical selected from the group consisting of the phenyl and alkyl radicals containing from 1 to 8 carbon atoms, and M is an alkali metal such as potassium, or sodium. The sodium derivatives are preferred. Examples of suitable mercaptans which may be employed in the process are methyl mercaptan, ethyl mercaptan, propyl mercaptan, butyl mercaptan, amyl mercaptan, hexyl mercaptan, octyl mercaptan or phenyl mercaptan.

The alkali metal mercaptide can be added as such, or be formed in situ in the aqueous reaction mixture. It can be prepared in usual ways, e.g. by reaction of the mercaptan with an aqueous solution of an alkali metal hydroxide.

Alternatively, an alkali metal mercaptide can be prepared by reaction of sodium or potassium hydrosulfide and an alkyl halide in an aqueous medium, e.g. by reaction of sodium hydrosulfide (NaHS) and methyl chloride in an aqueous solution. A starting aqueous solution of an alkali metal mercaptide prepared in either of these ways, can be reacted directly with an ortho- or para-halophenone to form the corresponding ar-(hydrocarbonylmercapto) phenone, in which case said starting aqueous solution provides the mercaptide reactant and also a medium for the reaction.

The reactants, i.e. the alkali mercaptide and the nuclear ortho- or para-halogenated-phenone, may be employed in any desired proportions, but for convenience and economy, the starting materials are usually employed in equimolecular, or substantially equimolecular, proportions, e.g. in amounts corresponding to one gram molecular proportion of the nuclear halogenated-phenone starting material per gram molecular equivalent proportion of the alkali metal mercaptide. Alternatively, a mixture of one mole of the mercaptan and an aqueous solution containing one molecular proportion of sodium hydroxide, or potassium hydroxide, may be employed per molecular equivalent proportion of the ar-halophenone starting material.

The reaction can be carried out at temperatures of from 140° to 225° C. in a liquid aqueous reaction medium i.e. liquid water containing the reactants, and at superatmospheric pressure. The proportion of the liquid aqueous reaction medium, i.e. water, is not critical. Usually an amount of the aqueous liquid of from one to five parts by weight per part of the sum of the reactants is employed. The reaction is usually carried out in an aqueous liquid medium under a pressure at least as great as the autogenous pressure of the mixture of the materials at reaction temperatures between 140° and 225° C., and greater pressure can be used.

In practice, a mixture of equimolecular proportions, or approximately equimolecular proportions, of the ar-halophenone reactant and a water solution of the alkali metal mercaptide, preferably a mixture of substantially equimolecular proportions of the ar-halophenone, the mercaptan and aqueous solution of an alkali metal hydroxide, is agitated and heated at a reaction temperature between 140° and 225° C. at superatmospheric pressure, e.g. autogenous pressure or higher, untitl the reaction is substantially complete. Thereafter, the mixture is cooled suitably to room temperature, or thereabout. In most instances the product crystallizes upon cooling and is easily separated from the aqueous liquid portion of the reacted mixture. The product can be recovered by dissolving it in a water-immiscible solvent such as benzene or toluene. The solution of the product may be filtered to remove insoluble substances, after which the product is recovered in usual ways, e.g. by heating the solution to distill the solvent, or by recrystallization. The recovered product may be further purified by crystallization from suitable solvent, e.g. petroleum ether, or ethyl alcohol.

In an alternate procedure, the product can be recovered from the aqueous reaction medium by allowing the reacted mixture to stand at temperatures of from 80° to 100° C., whereby it separates into a liquid organic layer and an aqueous layer, then separating the layers, or by allowing the reacted mixture to stand at temperatures between 80° and 100° C. until the layers separate, then cooling the materials to crystallize the product and separating the aqueous liquid from the solid product.

The following examples illustrate ways in which the principle of the invention has been applied, but are not to be construed as limiting its scope.

*Example 1*

Methyl mercaptan in amount of 19.3 grams (0.4 mole) was introduced into an aqueous solution of 144 cc. of water containing 16 grams (0.4 mole) of sodium hydroxide while stirring and cooling the solution to maintain it at a temperature of from 15° to 20° C. The resulting solution of sodium methyl mercaptide and 62 grams (0.4 mole) of para-chloroacetophenone were placed in an iron autoclave and the latter closed. The mixture was agitated and heated at a temperature of from 195° to 200° C. for 2 hours, then cooled to room temperature. Upon opening the autoclave, the reaction mixture was found to consist of an aqueous liquid phase and a crystalline product. The liquid was decanted. The crystalline product was dissolved in benzene at a temperature of 50° C. and was removed from the autoclave. The benzene solution was washed with water. The aqueous and organic layers were separated. The aqueous layer was combined with the aqueous liquid removed from the autoclave and was analyzed for chloride. The conversion was 100 percent. The organic layer was filtered. The filtrate was heated to distill and separate the benzene from the product. Distillation was continued to a point at which the residue in the still pot was being heated at a temperature of 103° C. at 10 millimeters absolute pressure. There was obtained 65.4 grams (0.294 mole) of para-(methylmercapto) acetophenone as a yellow crystalline residue having a melting point of 74° to 78° C. The yield of said product was 98.5 percent.

*Example 2*

A charge of 28.4 pounds of an aqueous 21.7 weight percent sodium hydrosulfide solution was placed in a pressure resistant vessel and heated to a temperature of 60° C. Thereafter, 5.1 pounds of methyl chloride was added under pressure over a period of 4 hours with stirring. The mixture was stirred and heated at 60° C. for a total time of 6 hours, then cooled to 25° C. and vented to atmospheric pressure. The resulting aqueous solution of sodium methyl mercaptide was stirred and heated under pressure to a temperature of 160° C. A charge of 12.4 pounds of para-chloroacetophenone was added under pressure over a period of 30 minutes. The mixture was stirred and heated at temperatures of from 170° to 175° C. for 3 hours, then cooled to room temperature. The solid crystalline product was separated from the aqueous medium by filtering. The product was melted by heating to a temperature of 100° C., was filtered while hot, then dried by heating at a temperature of 90° to 100° C. at 5 millimeters absolute pressure and cooled. There was obtained 13.1 pounds of para(methylmercapto) acetophenone product as yellow crystals melting at 69° to 74° C. The yield of said product was 99 percent based on the para-chloroacetophenone initially used.

*Example 3*

A charge of 43.9 grams (0.3 mole) of normal-octyl mercaptan, 46.4 grams of para-chloroacetophenone and 120 grams of an aqueous solution containing 10 percent by weight of sodium hydroxide was placed in an iron autoclave. The mixture was agitated and heated at temperatures of from 196° to 200° C. for a period of 20 hours then cooled to room temperature. The reaction mixture was removed from the autoclave and mixed with benzene. The aqueous and organic layers were separated. The organic layer was heated to distill and separate the benzene and unreacted starting materials from the product. Distillation was continued to a point at which the residue in the still pot was being heated at a temperature of 170° C. at 10 millimeters absolute pressure. There was obtained 63.5 grams of para-(octylmercapto) acetophenone as yellow crystals. The yield of said product was 80.1 percent. The para-(octylmercapto, acetophenone was recrystallized from petroleum ether. The purified product was obtained as white crystals having a melting point of 51.5° to 52.2° C. It was analyzed and found to contain 72.85 percent by weight of carbon, 9.1 percent of hydrogen and 12.27 percent of sulfur. The para-(octylmercapto) acetophenone is a new compound having the formula:

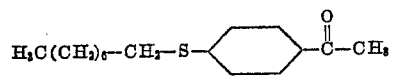

*Example 4*

A charge of 51 grams (0.33 mole) of para-chloroacetophenone, 29.8 grams (0.33 mole) of tertiary butyl mercaptan and 132 grams of an aqueous 10 weight percent solution of sodium hydroxide was placed in an iron autoclave. The mixture was agitated and heated at temperatures of from 178° to 182° C. for a period of 8 hours, then cooled to 25° C. The product was recovered from the reacted mixture by procedure similar to that desired in Example 1. There were obtained 20.6 grams of unreacted para-chloroacetophenone and 31 grams of para-tert.-butylmercaptoacetophene product boiling at temperatures of from 125° to 127° C. at 2 millimeters absolute pressure. It was analyzed and found to contain 68.4 percent of sulfur. The product is a new compound having the formula:

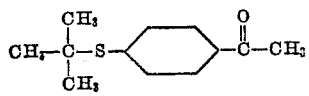

*Example 5*

A charge of 69.5 grams (0.33 mole) of para-chlorophenyl amyl ketone, 15.9 grams (0.33 mole) of methyl mercaptan and 132 grams of an aqueous solution containing 10 percent by weight of sodium hydroxide, was agitated and heated in an autoclave at temperatures of from 198° to 204° C. for a period of 20 hours, then cooled. The product was recovered from the reacted mixture by procedure similar to that described in Example 1. There was obtained 71.9 grams of para-(methyl-mercapto) phenyl amyl ketone as light yellow crystals having a freezing point of 62° C. The para-(methylmercapto)

phenyl amyl ketone is a new compound having the formula:

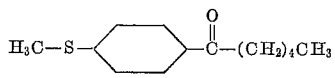

It was analyzed and found to consist of 70.25 percent by weight of carbon, 8.0 percent of hydrogen and 13.83 percent of sulfur.

*Example 6*

A charge of 71.5 grams (0.33 mole) of para-chlorobenzophenone 15.9 grams of methyl mercaptan and 132 grams of an aqueous 10 weight percent solution of sodium hydroxide was sealed in an iron bomb. The mixture was agitated and heated at temperatures between 197° and 202° C. under the autogenous pressure of the mixture of the materials for a period of 20 hours, then cooled. The bomb was opened and the contents removed. The reacted mixture was extracted with benzene at a temperature of 50° C. and the aqueous and organic layers separated. The aqueous layer was analyzed for chloride. The conversion was 95.5 percent. The benzene solution was evaporated to remove most of the benzene, then cooled. There was obtained 75.3 grams of yellow crystals. This material was recrystallized from ethyl alcohol. There was obtained 70.7 grams of para-(methylmercapto) benzophenone as light yellow crystals melting at 77° to 78.5° C.

*Example 7*

A charge of 46.4 grams (0.3 mole) of para-chloroacetophenone, 33.1 grams (0.3 mole) of phenyl mercaptan and 120 grams of an aqueous 10 weight percent solution of sodium hydroxide was sealed in an iron bomb. The mixture was agitated and heated at temperatures between 195° and 200° C. for a period of 7 hours, then cooled. The bomb was opened and the contents removed. The reacted mixture was washed with benzene. The aqueous and organic layers were separated. The aqueous layer was analyzed for chloride. The conversion was 100 percent. The organic layer was heated at temperatures up to 140° C. at an absolute pressure of 40 millimeters to remove the benzene, then cooled. There was obtained 67.2 grams of a light brown crystalline solid. It was recrystallized from 150 cc. of petroleum ether (B.P. 86°–100° C.). There was obtained 58.8 grams of para-(phenylmercapto) acetophenone as tan crystals melting at 65.5 to 66.5° C.

*Example 8*

A charge of 55.6 grams of a crude (80 percent) 4-chloro-3-methylacetophenone, 15.9 grams of methyl mercaptan and 132 grams of an aqueous 10 weight percent solution of sodium hydroxide and heated at temperatures between 200° and 203° C. for a period of 7 hours, then cooled. The bomb was opened and the contents removed. The reacted material was mixed with benzene. The aqueous and organic layers were separated. The conversion was 79.5 percent. The organic layer was distilled. There was obtained 36.4 grams of 4-(methylmercapto)-3-methylacetophenone boiling at temperatures of from 165° to 176° C. at 13 millimeters absolute pressure.

By substituting for the mercaptans shown in the examples, ethyl mercaptan or normal propyl mercaptan, or by substituting for the ar-halophenones, para-chloropropiophenone, ortho-chloroacetophenone, 4-chloro-3-methylbenzophenone, or para-chlorobenzophenone, the corresponding ar-(hydrocarbonylmercapto) phenones are obtained.

This application is a continuation-in-part of our application Serial No. 394,486, filed November 25, 1953, now abandoned.

We claim:
1. A process which comprises reacting a nuclear halogenated which is a member of the group consisting of the ortho- and para-halophenones having the general formula:

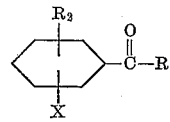

wherein R represents a member of the group consisting of the phenyl and alkyl radicals containing from 1 to 8 carbon atoms, $R_2$ is a member of the group consisting of hydrogen and the methyl radical, and X represents a halogen atom selected from the group consisting of chlorine and bromine, with mercaptide having the general formula:

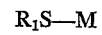

wherein $R_1$ represents a hydrocarbon radical selected from the group consisting of the phenyl and alkyl radicals containing from 1 to 8 carbon atoms, and M is an alkali metal, by heating a mixture of approximately equimolecular proportions of the ingredients under superatmospheric pressure at reaction temperatures of from 140° to 225° C. in admixture with liquid water as the reaction medium.

2. A process for making para-(methylmercapto) acetophenone which comprises heating a mixture of approximately equimolecular proportions of para-chloroacetophenone and an aqueous solution of sodium methyl mercaptide at reaction temperatures of from 140° to 225° C. under superatmospheric pressure.

3. A process for making para-(octylmercapto) acetophenone, which comprises heating a mixture of approximately equimolecular proportions of parachloroacetophenone an octyl mercaptan in admixture with an aqueous solution containing an approximate molecular equivalent amount of sodium hydroxide at temperatures of from 140° to 225° C. under superatmospheric pressure.

4. A process for making para-(ert.-butylmercapto) acetophenone which comprises heating a mixture of approximately equimolecudar proportions of para-chloroacetophenone and tert.-amyl mercaptan in admixture with an aqueous solution containing an approximate molecular equivalent proportion of sodium hydroxide at reaction temperatures of from 140° to 225° C. under superatmospheric pressure.

5. A process for making para-(methylmercapto) benzophenone, which comprises heating a mixture of approximately equimolecular proportions of para-chlorobenzophenone and methyl mercaptan in admixture with an aqueous solution containing an approximate equimolecular proportion of sodium hydroxide at reaction temperatures of from 140° to 225° C. under superatmospheric pressure.

6. A process for making para-(methylmercapto) phenyl amyl ketone which comprises heating a mixture of approximately equimolecular proportions of para-chlorophenyl amyl ketone and methyl mecaptan in admixture with an aqueous solution containing an approximate equimolecular proportion of sodium hydroxide at reaction temperatures of from 140° to 225° C. under superatmospheric pressure.

References Cited in the file of this patent
UNITED STATES PATENTS
2,761,873    Gregory et al. _____ Sept. 4, 1956

UNITED STATES PATENT OFFICE
CERTIFICATE OF CORRECTION

Patent No. 2,905,715                                                September 22, 1959

Andrew J. Dietzler et al

It is hereby certified that error appears in the printed specification of the above numbered patent requiring correction and that the said Letters Patent should read as corrected below.

Column 6, lines 4 and 5, claim 1, for "halogenated" read -- halogenated-phenone --; line 44, claim 4, for "para-(ert.-butylmercapto)" read -- para-(tert.-butylmercapto) --.

Signed and sealed this 26th day of April 1960.

(SEAL)
Attest:

KARL H. AXLINE                                      ROBERT C. WATSON
Attesting Officer                                  Commissioner of Patents